United States Patent
Cambou et al.

(10) Patent No.: US 11,936,782 B2
(45) Date of Patent: Mar. 19, 2024

(54) SECURE MULTI-STATE QUANTUM KEY DISTRIBUTION WITH WAVELENGTH DIVISION MULTIPLEXING

(71) Applicant: Arizona Board of Regents on Behalf of Northern Arizona University, Flagstaff, AZ (US)

(72) Inventors: Bertrand F. Cambou, Flagstaff, AZ (US); Ines Montano, Flagstaff, AZ (US); Ryan Behunin, Flagstaff, AZ (US); Vince Rodriguez, Flagstaff, AZ (US)

(73) Assignee: ARIZONA BOARD OF REGENTS ON BEHALF OF NORTHERN ARIZONA UNIVERSITY, Flagstaff, AZ (US)

( * ) Notice: Subject to any disclaimer, the term of this patent is extended or adjusted under 35 U.S.C. 154(b) by 0 days.

(21) Appl. No.: 18/104,705

(22) Filed: Feb. 1, 2023

(65) Prior Publication Data
US 2024/0048372 A1    Feb. 8, 2024

Related U.S. Application Data

(63) Continuation of application No. 16/951,760, filed on Nov. 18, 2020, now Pat. No. 11,595,199.

(60) Provisional application No. 62/936,793, filed on Nov. 18, 2019.

(51) Int. Cl.
*H04L 29/06* (2006.01)
*H04B 10/079* (2013.01)
*H04B 10/70* (2013.01)
*H04L 9/08* (2006.01)

(52) U.S. Cl.
CPC ..... *H04L 9/0858* (2013.01); *H04B 10/07957* (2013.01); *H04B 10/70* (2013.01)

(58) Field of Classification Search
CPC ........................................ H04L 9/0858
See application file for complete search history.

(56) References Cited

U.S. PATENT DOCUMENTS

| | | | |
|---|---|---|---|
| 6,748,081 B1 * | 6/2004 | Dultz | C09K 19/02 380/277 |
| 8,837,735 B2 * | 9/2014 | Brodsky | H04J 14/0246 380/278 |
| 9,196,788 B1 * | 11/2015 | Wierer | H01L 33/06 |
| 2002/0154315 A1 * | 10/2002 | Myrick | G01J 3/524 359/326 |

(Continued)

*Primary Examiner* — Dao Q Ho
(74) *Attorney, Agent, or Firm* — Quarles & Brady LLP

(57) ABSTRACT

The performance of quantum key distribution by systems and methods that use wavelength division multiplexing and encode information using both wavelength and polarization of photons of two or more wavelengths. Multi-wavelength polarization state encoding schemes allow ternary-coded digits, quaternary-coded digits and higher-radix digits to be represented by single photons. Information expressed in a first radix can be encoded in a higher radix and combined with a string of key values to produce a datastream having all allowed digit values of that radix in a manner that allows eavesdropping to be detected without requiring the sender and receiver to exchange additional information after transmission of the information.

14 Claims, 9 Drawing Sheets

(56) References Cited

U.S. PATENT DOCUMENTS

| | | | | |
|---|---|---|---|---|
| 2004/0094698 A1* | 5/2004 | Imaki | ............ | G02B 27/288 |
| | | | | 250/225 |
| 2004/0109564 A1* | 6/2004 | Cerf | ............ | H04L 9/0858 |
| | | | | 380/256 |
| 2005/0152540 A1* | 7/2005 | Barbosa | ............ | H04L 9/0858 |
| | | | | 380/28 |
| 2007/0076884 A1* | 4/2007 | Wellbrock | ............ | H04L 9/0855 |
| | | | | 380/263 |
| 2010/0074447 A1* | 3/2010 | Luo | ............ | H04B 10/70 |
| | | | | 398/79 |
| 2020/0007242 A1* | 1/2020 | Li | ............ | H04B 10/25133 |
| 2023/0393335 A1* | 12/2023 | Challener | ............ | G02B 6/126 |

* cited by examiner

FIG. 5C

SECURE MULTI-STATE QUANTUM KEY DISTRIBUTION WITH WAVELENGTH DIVISION MULTIPLEXING

CROSS-REFERENCE TO RELATED APPLICATIONS

This application is a continuation of U.S. patent application Ser. No. 16/951,760 filed under the same title on Nov. 18, 2020, which claims priority to U.S. Provisional Patent Application No. 62/936,793 entitled "Secure Multi-State Quantum Key Distribution with Wavelength Division Multiplexing" and filed on Nov. 18, 2019, the entire contents of which are incorporated herein in their entirety for all purposes.

STATEMENT OF GOVERNMENT SUPPORT

This invention was supported by the United States Air Force Research Laboratory under contract FA8750-19-2-0503. The Government has certain rights therein.

BACKGROUND OF THE INVENTION

Conventional secure communication techniques involve transmitting encrypted information over a channel such as an electrical transmission line, a fiber-optic cable, or through free space using electromagnetic waves. Such techniques make use of cryptographic methods utilizing shared secrets (i.e., a cryptographic key) between a sender and a receiver to ensure that only the intended parties can properly encode and decode a message. However, these techniques are vulnerable to eavesdropping which may lead to the content of the communication being compromised. Advanced techniques use quantum cryptographic methods which include quantum key distribution (QKD) protocols to enhance security. Quantum cryptography takes advantage of consequences of the Heisenberg uncertainty principle, namely that measurement of a quantum state necessarily disturbs that state. In practice this means that any eavesdropper to a communication over a properly implemented quantum channel will disturb the communication, revealing the presence of the eavesdropper. A shared encryption key may be generated and transmitted over a potentially insecure quantum channel, followed by verification that the key was not intercepted.

Many QKD protocols are based on the use of two random number generators. The first random number generator determines which of two possible sets of basis states (denoted by 'x' and '+') will be used by the sender to emit each of a stream of qubits over an optical quantum channel. The second random number generator is used to select one of the two possible bases as a measurement basis for the incoming stream of qubits. After transmission, both communicating parties, in an example referred to as Alice and Bob, share the respective sequence of bases they used to select a portion of the stream transmitted and received with the same bases (i.e., x/x or +/+) and use this portion to construct a shared key. Under normal conditions, the expectation is that such a portion of the stream should contain a very small number of errors. The portion of the stream transmitted with misaligned bases, (i.e., either x/+ or +/x, contains many errors and is ignored. However, when eavesdropping of the stream of qubits has occurred, the error rate will be much higher than expected. In order to determine whether eavesdropping has taken place, the error rate must be measured by the sender and receiver by exchanging partial information about the key over an unsecured channel. If the number of errors is small, the communicating parties assume that the key distribution was secure.

BRIEF SUMMARY

In an embodiment a method for secure communication is provided. The method includes receiving a message and encoding the message according to a digital notation to produce an encoded message. The encoded message has a first radix defining a set of at least three distinct digit values and excludes a particular digit value of the first radix. The method also includes generating a datastream according to the digital notation that combines the encoded message with a string of key values. The datastream includes the particular digit value.

The method also includes selecting first and second optical polarization bases; generating a first set of photons that represent digit values of a first portion of the datastream. Each polarization basis defines for each possible digit value in the first radix, a corresponding polarization axis. Each photon of the first set of photons polarized along a polarization axis defined by the first polarization basis for the digit value represented by that photon.

The method also includes generating a second set of photons that represent digit values corresponding to digit values of a second portion of the datastream. Each photon of the second set of photons is polarized along a polarization axis defined by the second polarization basis for the digit value represented by that photon. A first proportion of the first set of photons has a first wavelength and a second proportion of the first set of photons has a second wavelength and a first proportion of the second set of photons has the second wavelength and a second proportion of the second set of photons has the first wavelength.

In another embodiment, a method includes receiving incoming photons representing digit values of a datastream that includes at least three distinct digit values; selecting between first and second measurement bases for each photon; performing a polarization measurement on each photon that determines a polarization axis of that photon in the measurement basis selected for that photon and a wavelength of that photon; and decoding the datastream using the wavelength and polarization of each of the polarized photon, including generating a signal indicating whether at least a portion of the datastream was altered.

The incoming photons include photons having a first wavelength and photons having a second wavelength and each measurement basis defines a pair mutually orthogonal polarization axes. The first measurement basis defines, for each of the first and second wavelengths, a first polarization axis in a plane for that wavelength and a second polarization axis in that plane that is perpendicular to the first polarization axis for that wavelength. The second measurement basis defines, for each of the first and second wavelengths, a third polarization axis in the plane for that wavelength and a fourth polarization axis in the plane for that wavelength that is perpendicular to the third polarization axis for that wavelength. The third and the fourth polarization axes for each wavelength are equally-weighted vector combinations of the first and second polarization axes for that wavelength.

In another embodiment an optical communication device is provided. The device includes a first photon detector, a second photon detector. The first photon detector is configured to detect photons having a first wavelength and to signal polarization orientations of those photons and a first optical polarization controller coupled to the first optical detector. The second photon detector is configured to detect photons having a second wavelength and to signal polarization orientations of those photons and a second optical polarization controller coupled to the second optical detector.

The device also includes an optical interface coupled to the first and second polarization controllers. The optical interface is configured receive incoming photons representing a datastream and to maintain orientation of a polarization of a first incoming photon with respect to polarizations of subsequent incoming photons. The device also includes a processor coupled to the first and second optical detectors and to the first and second polarization controllers The processor configured to: select a chosen measurement basis between first and second measurement bases for each incoming photon; configure the first and second polarization controllers such that the first and second optical detectors measure polarization with respect to the measurement basis selected for that photon; perform a polarization measurement on each photon that determines a polarization axis of that photon in the measurement basis selected for that photon and a wavelength of that photon; and decode the datastream using the wavelengths and polarizations of the incoming photon, including generating a signal indicating whether at least a portion of the datastream was altered.

Each measurement basis defines a of pair mutually orthogonal polarization axes for the each of the first and second wavelengths. The first measurement basis defines, for each of the first and second wavelengths, a first polarization axis in a plane for that wavelength and a second polarization axis in that plane that is perpendicular to the first polarization axis for that wavelength. The second measurement basis defines, for each of the first and second wavelengths, a third polarization axis in the plane for that wavelength and a fourth polarization axis in the plane for that wavelength that is perpendicular to the third polarization axis for that wavelength. The third and the fourth polarization axes for each wavelength are equally-weighted vector combinations of the first and second polarization axes for that wavelength.

The above features and advantages of the present invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

FIGS. 4A-4B depict optical encoding schemes for a dual-wavelength WDM QKD system that transmits ternary-coded binary data using a third state dedicated to use for error detection and an analogous three-wavelength WDM QKD system that transmits quaternary-coded ternary data.

FIGS. 5A-5C depict optical encoding schemes for alternative dual-wavelength and three-wavelength WDM QKD systems that transmit ternary and quaternary information.

DETAILED DESCRIPTION

Figure 1:
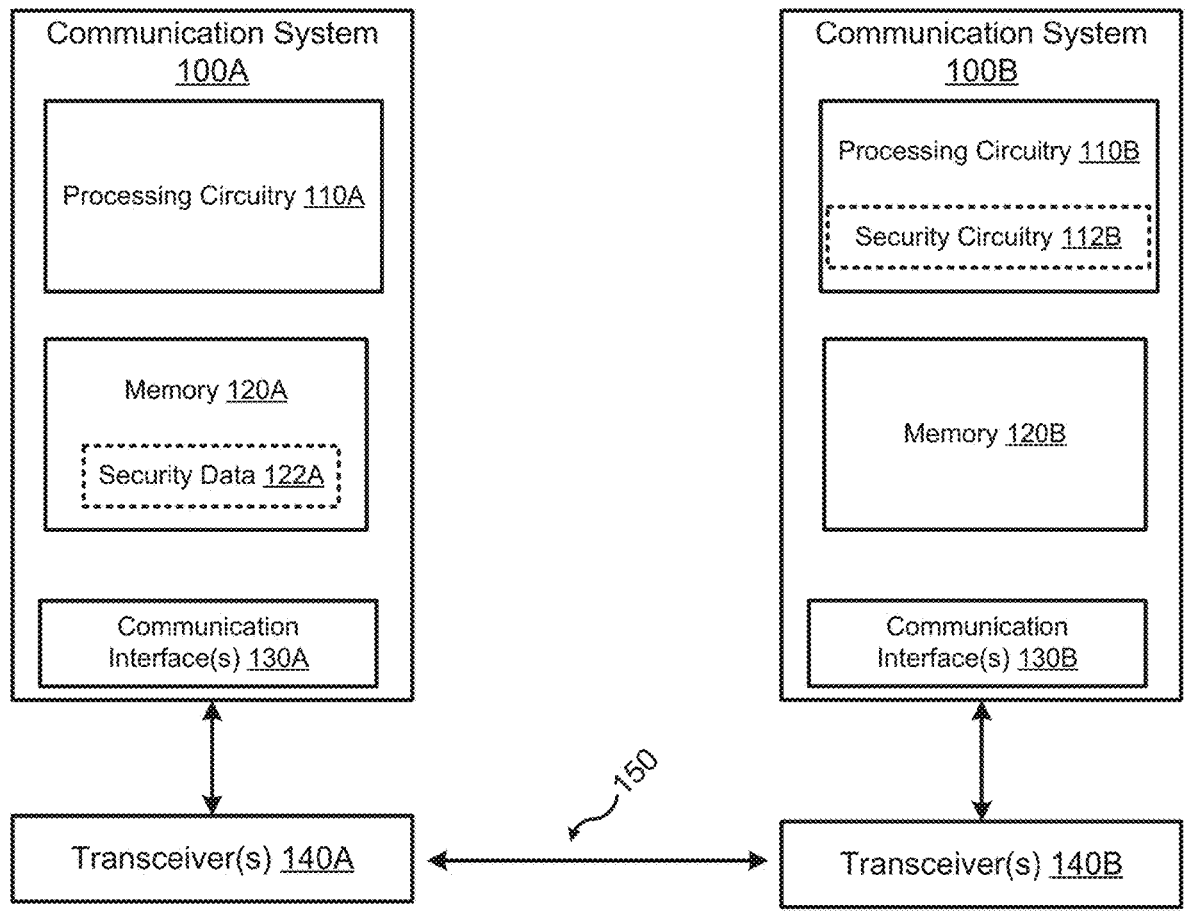
FIG. 1 depicts a schematic of example communication systems in which embodiments disclosed herein may be practiced.

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus, appearances of the phrase "in one embodiment," "in an embodiment," and similar language throughout this specification may, but do not necessarily, all refer to the same embodiment.

Conventional optical protocols for quantum-secured communications, such as the well-known BB84 protocol for performing quantum key distribution (QKD), are based on the transmission of random sequences of bits, '0's or '1's, which are turned into quantum bits (qubits) through a quantum channel. The transmitting party uses a first random number generator to randomly select one of two possible polarization bases ('+', and 'x') for each transmitted qubit. With BB84, if the basis is '+', single photons are oriented at 0° (→) to transmit a '0', or at 90° (↑) to transmit a '1'. If the basis chosen is 'x', single photons are either oriented at 45° (↗) to transmit a '0' or at 135° (↖) to transmit a '1'. The receiving party uses a second random number generator also selects a between the same polarization bases to determine how the polarization of each photon will be measured.

After transmission, both communicating parties share the respective positions of their bases to determine which photons were transmitted and measured using the same polarization basis (i.e., generated using the 'x' basis and measured in the 'x' basis or generated using the '+' basis and measured in the '+' basis). When the basis used by both parties is the same, the transmission should contain only a very small number of errors, unless an eavesdropping party disturbs the data. The portion of the stream transmitted with mismatching bases is ignored, because the error rate is in the 50% range. As part of QKD protocols, the communicating parties share a small portion of the content of the stream of qubits transmitted with bases aligned to confirm the very small number of errors and to verify that eavesdropping is not disturbing the transmission. If the number of errors is small enough, the communicating parties may assume that the key distribution is secure.

The combination of quantum communication channels (or classical channels which share important characteristics of quantum channels) with ternary cryptography and addressable PUFs allows the design of communication protocols which have the potential to strengthen existing key distribution protocols or improve communications over quantum channels by replacing conventional QKD protocols. These protocols are able to detect eavesdropping without exchanging additional information between the parties, which would otherwise occur if communicating using conventional quantum communication protocols (including during a conventional QKD protocol). Reducing or eliminating the additional information exchange required by conventional QKD protocols further enhances security.

QKD schemes may be adapted to natively transmit ternary and cryptographic keys is based be defining three states for each "base": for the basis '+', the state '−' is transmitted at 0° (→), the '0' at 45° (↗), and the '+' at 90° (↑); for the basis 'x', the '−' is transmitted at 45° (↗), the '0' at 90° (↑), and the '+' at 135° (↗). This method works well only when packets of photons are transmitted, rather than single photons, which is acceptable for some applications. However, systems in which each unit of information is carried by a single photon may improve security because they render attacks which rely on photon statistics ineffective. Using more than one wavelength can enable systems to use single photons to natively represent ternary digits, quaternary digits, and beyond.

The use of multiple wavelengths and wavelength-division multiplexing (WDM) has been described to increase the throughput of QKD, following the mainstream BB84 protocol. Various methods disclose assigning different wavelengths to individual quantum channels and then transmitting single photon signals over those channels. Initially, WDM combines photons with different wavelengths and transmits them through a quantum channel. Upon receipt, a second WDM redirects the photons to several detectors, which are sensitive to their respective wavelengths, to analyze the polarization orientations of the photons. All channels have wavelengths around 1550 nm. The WDM link can be a 3-channel WDM link comprising two quantum channels for transmitting single photon signals and one conventional channel for transmitting conventional data or triggering signals.

FIG. 1 is a schematic illustrating communications systems in which embodiments disclosed herein may be practiced. In this example, communication system 100A acts as the sender ("Alice") and communication system 100B acts the receiver ("Bob"). The communication systems 100A/B each have respective processing circuitry 110A/B, memory 120A/B, communication interfaces 130A/B, and transceivers 140A/B. Each system communicates sends and/or receives information via its communication interface 140A/B. The communication interfaces 130A/B are coupled to transceivers 140A/B which send signals over a communication channel 150. The processing circuitry 110B of communication system 100B may optionally include security circuitry 112B, for use with certain embodiments disclosed herein. Similarly, the memory 120A of communication system 100A may optionally store security data 122A for use with certain embodiments.

In embodiments of the communication system 100B having the security circuitry 112B, the security circuitry 112B may include a dedicated PUF array. In such embodiments, the processing circuitry 110B may be configured to respond to an authentication challenge which specifies an address (or range of addresses) in the PUF array and a set of operations to perform in order to generate a unique response to the authentication challenge. Such embodiments may be designed to communicate with embodiments of communication system 100A configured to store security data 122A in the memory 120A. In such embodiments, the processing circuitry 110A is configured to generate authentication challenges and receive responses to those challenges. The responses and challenges may be saved as part of the security data 122A. In such embodiments the processing circuitry 110A may be further configured to send randomly selected challenges to embodiments of communication system 100B having security circuitry 112B. In certain embodiments described herein, transmitting the challenges to communication system 100B allows communication systems 100A and 100B to agree upon the challenge responses as shared encryption keys without required information which might compromise the secrecy of those keys to be transmitted, as described below. In some embodiments, challenge responses may be used to generate a string of key values which may be interleaved with a transmission such that the communication 100B can verify the integrity of a transmission from communication system 100A which includes otherwise unknown data.

Figure 2:
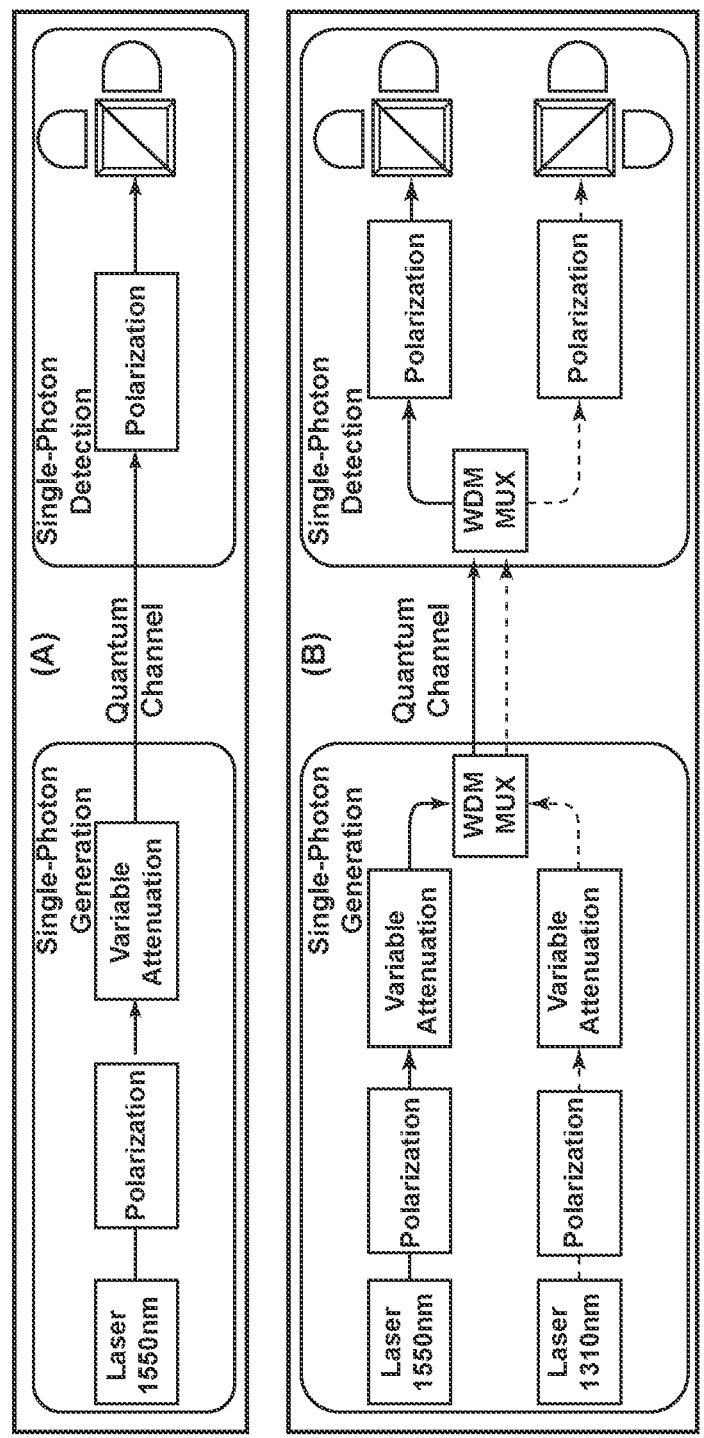
FIG. 2 depicts block level diagrams of a single-wavelength system suitable for use as a quantum key distribution system and a dual-wavelength system suitable for use as a quantum key distribution system.

FIG. 2A shows a flow diagram of an example system for single-wavelength QKD between a sender "Alice" and a receiver "Bob" (e.g., the communication systems 100A and 100B of FIG. 1). A laser operating at 1550 nm in this example, or any other suitable photon source, generates photons which are polarized using a polarization control device according to a suitable encoding scheme to represent information (e.g., digit values of bits, digit values of trits, etc.). As shown, a variable optical attenuator may be used to adjust the number of photons such that only single photons are produced. The signal (i.e., one or more polarized photons) is transmitted over a quantum channel (e.g., a polarization-maintaining optical medium such as a polarization-maintaining optical fiber). On the receiving end, the polarization of the received photons may be adjusted as described below before being routed two a detector, shown in this example as a pair of photodiodes coupled to a polarization-sensitive beam splitter.

Alice can send single photons to "Bob" and the polarization states of those photons encode digital information. In an example, the Alice can generate a photon using a first polarization basis with two possible states: horizontal polarization and vertical polarization (this basis will be called the rectilinear basis, or '+'). Alice can also generate a photon in a basis that is rotated by 45° from the first basis (this basis will be called the diagonal basis or 'x'). In other words, the horizontal and vertical polarization axes in the second basis are rotated 45° respectively from the horizontal and vertical polarization axes of the rectilinear basis. The conversion between binary-encoded ternary values and photon polarizarions for this example is shown in Table I, below.

Each row of Table I corresponds to a possible bit pair Each bit is transmitted as one or more photons with a polarization axis defined by the choice of polarization basis ('+' or 'x') and the value of the bit. The photon polarizations for each bit pair are shown in the columns labeled "Rectinlinear basis ('+')" and "Diagonal Basis ('x')". For example when the rectilinear basis is used, the bit value '0' is transmitted as photons polarized horizontally (denoted by →) and the bit value '1' is transmitted as photons polarized vertically (denoted by →). The diagonal basis is rotated 45° from the rectilinear basis. Thus, in the diagonal basis the bit value '0' is transmitted as photons polarized horizontally in the rotated basis (denoted by ↗) and the bit value '1' is transmitted as photons polarized vertically in the rotated basis (denoted by ↖). Because the polarization axes define by the rectilinear basis are equally-weighted vector combinations of those in the diagonal basis (and vice versa), attempts to measure photons using the wrong measurement basis will produce random results. For instance, if either '↗' photons or '↖' photons are measured using the '+' basis, the result will be either '→' or '↑' in random fashion.

The system of FIG. 2A can be adapted to transmit ternary or quaternary data by coding those values as bit pairs, as in the non-limiting example of Table I below.

TABLE I

| Bit Pair | Rectilinear Basis ('+') | | Diagonal Basis (X) | |
|---|---|---|---|---|
| 00 | → | | ↗ | |
| 01 | → | ↑ | ↗ | ↖ |
| 10 | ↑ | → | ↖ | ↗ |
| 11 | ↑ | ↑ | ↖ | ↖ |

Table II below illustrates an example of transmitting and receiving a bit stream consisting of eight binary-encoded ternary values, or 8-bit pairs. Each column indicates a bit pair belonging to the bit stream (ordered from 1 to 8). For each column the bit stream value to be transmitted is shown, along with Alice's choice of basis, Bob's choice of basis, and the resulting bit pair measured by Bob. The bit stream in this example is (10, 01, 01, 11, 10, 10, 01, and 01). As described above, the sender ("Alice") and receiver ("Bob") each select a basis for each bit pair. When Alice's basis and Bob's basis are the same, Bob measures the same values as transmitted by Alice if there has been no eavesdropping. However, when Alice and Bob randomly select different bases, Bob measures a random value. Instances of errors are shown in bold in Table II. Note that the process is not deterministic; for example, if the 5th bit pair were sent repeatedly using the same basis and measured repeatedly using the same basis, Bob might measure any of the four possible values of the bit pair. Note that when Alice's basis is aligned with Bob's basis, Bob measures the same values as those transmitted by Alice. However, when the Alice's basis and Bob's bases are misaligned, each received bit will be measured randomly by the Bob as '0' or '1'.

TABLE II

| | 1 | 2 | 3 | 4 | 5 | 6 | 7 | 8 |
|---|---|---|---|---|---|---|---|---|
| Transmitted: | 10 | 01 | 01 | 11 | 10 | 10 | 01 | 10 |
| Alice's basis: | + | X | + | + | X | + | X | X |
| Bob's basis: | + | X | X | + | + | X | X | + |
| Measured: | 10 | 01 | 01 | 11 | 01 | 11 | 01 | 01 |

As described briefly earlier, quantum communication protocols can support the direct transmission of trits across optical quantum channels. Previously described embodiments can be modified to achieve similar advantages by using a binary to ternary conversion, along with ternary keys shared between the communicating parties.

One example of a system allowing native transmission of trits involves transmitting photons with one of three polarization axes which are vertical (polarization axis of 90 degrees, '↑'), horizontal (polarization axis of 0 degrees, '→'), or diagonal (↗ or ↖) relative to one of two reference orientations such as those given by the two bases, '+' and 'x'. In this example, Alice uses N photons to transmit each trit and the value of the trit is represented by the number of photons received by Bob. Note, however, that four photon polarization axes (↑, →, ↗, ↖) are available between the two bases ('x' and '+'). When Alice and Bob communicate without eavesdropping Bob will always measure N, N/2, or 0 photons, corresponding to the three allowed trits. However, when Bob choses the correct basis and Eve intercepts the communication using a basis which does not match Alice's, Bob's measurements will be altered, including by sometimes measuring N/4 photons. Even if Bob cannot distinguish a change in the absolute number of photons, the presence of Eve will also cause a change in the relative number of photons Bob measured for each trit in certain cases, ultimately allowing Bob to detect the presence of Eve. Such a method can be sensitive to partial eavesdropping when even only a fraction of the communication is intercepted.

Table III illustrates the scheme ternary scheme above illustrates the effect of eavesdropping in this scheme. The values in the "Trit value" column indicate the possible trit. The "Photon state" column indicates the photon polarization corresponding to each trit value for each of Alice's two possible polarization basis choices. For each photon state, Table III has four columns, each corresponding to a combination of polarizers for Bob and Eve. Instances where the presence of Eve's polarizer affects Bob's measurements are shown in bold. The columns are grouped by Bob's polarizer choice. There are two columns for each of Bob's two possible choices (0° and 45°), one where Eve's choice matches Bob's, and one where Eve's choice does not match Bob's.

TABLE III

| | | | | Bob's Polarizer | | | |
|---|---|---|---|---|---|---|---|
| | | | | Bob Chooses 0° | | Bob Chooses 45° | |
| | | | | Eve's Polarizer | | | |
| | | Trit value | Photon state | Eve Chooses 0° | Eve Chooses 45° | Eve Chooses 45° | Eve Chooses 0° |
| Alice's Polarizer 0° (+) | Alice Chooses '0' | − | → | N | N/4 | N/2 | N/2 |
| | | '0' | ↗ | N/2 | N/2 | N | N |
| | | + | ↑ | 0 | N/4 | N/2 | N/2 |
| Alice Chooses 45° (x) | | − | ↖ | N/2 | N/2 | N | N/4 |
| | | '0' | ↑ | 0 | 0 | N/2 | 0 |
| | | + | ↗ | N/2 | N/2 | 0 | N/4 |

For the single-wavelength schemes described above, it will be appreciated that when one photon is used as a qubit, it is possible for Alice and Bob to communicate by transmitting and measuring single photons. However, if photons are used as described above, and illustrated by Table III, at least two photons must be sent per trit in order for Bob to unambiguously distinguish between the three possible digit values denoted by {−, '0', +}.

As shown in FIG. 2B, an additional light source may be added to support QKD schemes that use ternary values and beyond. Some such schemes, as described below, may be used to eliminate the need for Bob to count photons, rendering so-called photon-number splitting attacks that rely intercepting a portion of the photons sent by Alice for each unit of information and passing the rest on unaltered, ineffective. In FIG. 2B, the laser of FIG. 2A is augmented with a second laser, operating at 1310 nm in this example, or any other suitable photon source, that generates photons at 1310 nm. Both light sources may be coupled to single channel using a wavelength division multiplexing (WDM) and may be demultiplexed at the receiving end where they are routing to separate detectors. In this example, each detector includes a polarization control device coupled to a polarization-sensitive beamsplitter coupled to two photodiodes.

Figure 3:
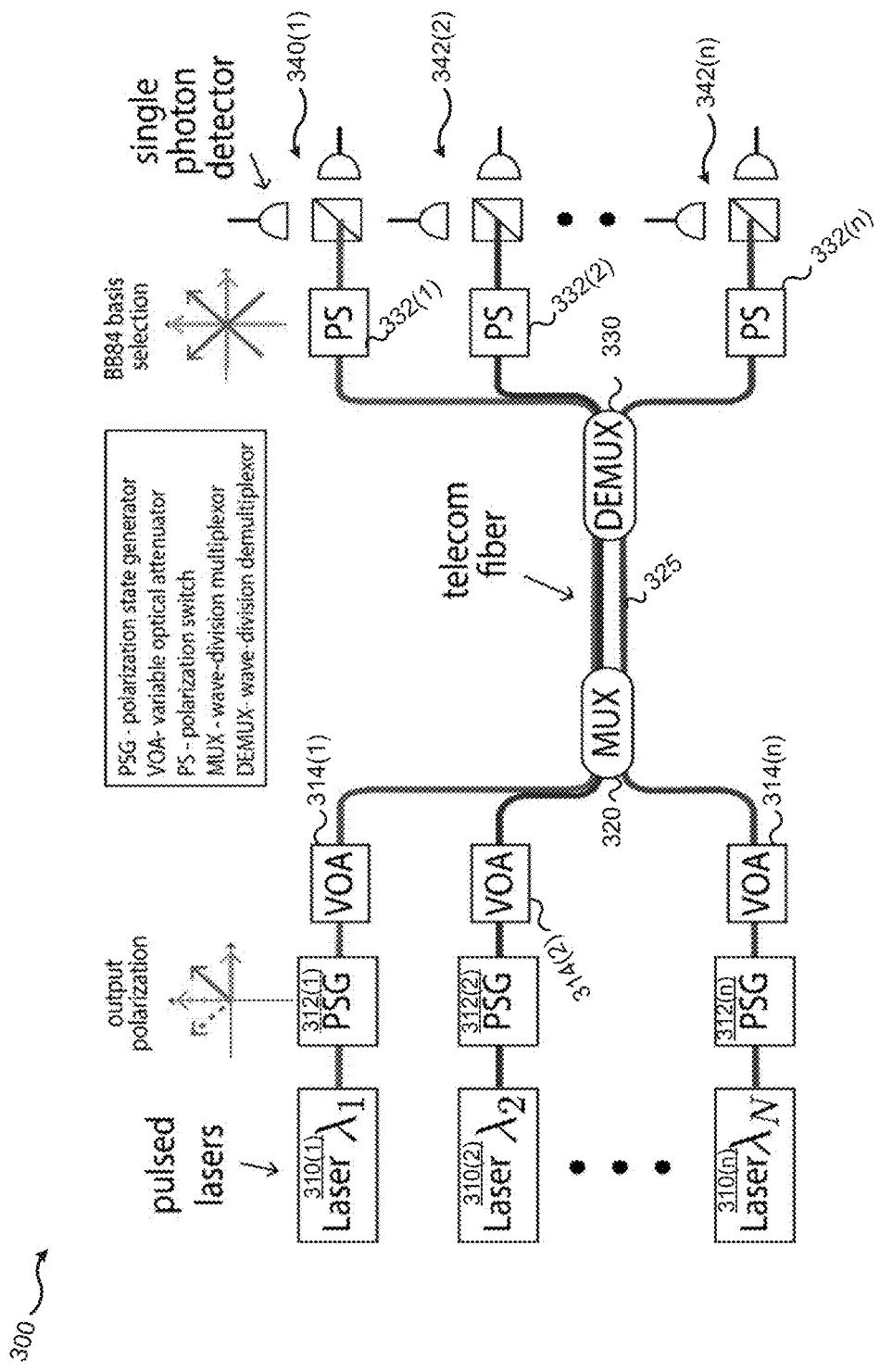
FIG. 3 depicts a block level diagram of a generalized multi-wavelength system suitable for use as a wavelength-division-multiplexed quantum key distribution system

FIG. 3 shows a generalized example system 300 that supports N distinct wavelengths. The system 300 includes a laser 310 corresponding to each of the wavelengths $\{\lambda_1, \lambda_2, \ldots \lambda_N\}$ (i.e., the lasers $\{310(1), 310(2), \ldots 310(n)\}$. Each laser 310 is coupled to a polarization state generator (a PSG 312, i.e., the PSGs $\{312(1), 312(2), \ldots 312(n)\}$. The PSGs 312 allow the polarization state of photons generated by the lasers 310 to be controlled in order to produce photons with one of several well-defined polarizations. Afterwards, the photons from each laser 310 are coupled into respective variable optical attenuators (i.e., the VOAs $\{314(1), 314(2), \ldots 314(n)\}$. The output of the lasers 310 are next coupled by a multiplexer 320 into an optical fiber 325. On the receiving side, the output of the lasers 310 are coupled to a demultiplexer 330 and routed to corresponding polarization switches 332 (i.e., the PSs $\{332(1), 332(2), \ldots 332(n)\}$ and then to corresponding polarization-sensitive detectors 340 (i.e., the detectors $\{340(1), 340(2), \ldots 340(n)\}$. As shown the, the detectors 342 each include a polarization sensitive beam-splitter coupled to a pair of photodiodes.

In practice, the transmitting party controls N single photon sources of distinct wavelengths and controls the polarization of the emitted photons using a polarization state generator. Wavelength-division multiplexing combines the output of these single photon sources to enable transmission to the receiving party using a standard optical fiber (e.g., Corning SMF-28e). The receiving party recovers the wavelength and the polarization state of the transmitted photons in three steps. First, transmitted photons are deterministically demultiplexed, enabling photons of a given wavelength to be sent to distinct sets of detectors for each wavelength. Second, for each wavelength, a polarization switch in parallel with a polarizing beam splitter (PBS) is used to switch between the two polarization bases used in the BB84 protocol (i.e., '+' and 'x'). Third, for each wavelength, the photons are spatially-filtered by polarization state using the PBS to direct photons to dedicated single photon detectors corresponding to each polarization orientation in order to retrieve the photons' polarization. When the transmitting party's choice of polarization basis is the same as the receiving party's choice of measurement basis, the photon polarizations will be correctly detected; otherwise, they will be either correctly or incorrectly detected by chance. The configuration of beam splitters and detectors for each wavelength may be treated as a combined polarization-sensitive detector that signals the measured polarization of incoming photons.

Using multiple wavelengths, a single photon can encode a vast amount of information with multiple states such as ternary and quaternary or higher and yet retain key quantum physical properties of single wavelength QKD such as BB84. For example, if during every clock cycle, the QKD quantum channel sends a photon that encodes a trit, or a quatrit, the throughput of information transmitted is higher than if each photon encodes a bit. If C is the number of cycles per nano-second, the information transmitted by a single wavelength is $2^C$/ns. With two wavelengths, the throughput is $3^C$/ns for trits, and $4^C$/ns for quatrits. For example, if C=100, the data rate of information transmitted per nanosecond increases from $2^{100}$ (~$1.3 \times 10^{30}$) to $3^{100}$ (~$5.2 \; 10^{47}$) for trits and $4^{100}$ (~$1.6 \; 10^{60}$) for quatrits.

It should be understood that, although subsequent descriptions refer to a single choice of polarization basis (i.e., '+' or 'x') that the absolute polarization states of photons transmitted using any one wavelength need not be aligned with the polarization states of the photons transmitted at any other wavelength, so long as the relative orientations of the polarization states are maintained. For example, the horizontal state ('→') and the vertical state in the '+' basis ('↑') may be defined as 0° and 90°, respectively, relative to an arbitrary reference for $\lambda_1$. Meanwhile, the same states $\{→, ↑\}$ may be defined as $\{15°, 105°\}$ for $\lambda_2$, and so on. Furthermore, although embodiments herein may describe systems and methods that select a single basis at any given time, in some embodiments, the polarization basis may be selected independently for each wavelength.

Figures 4A, 4B:
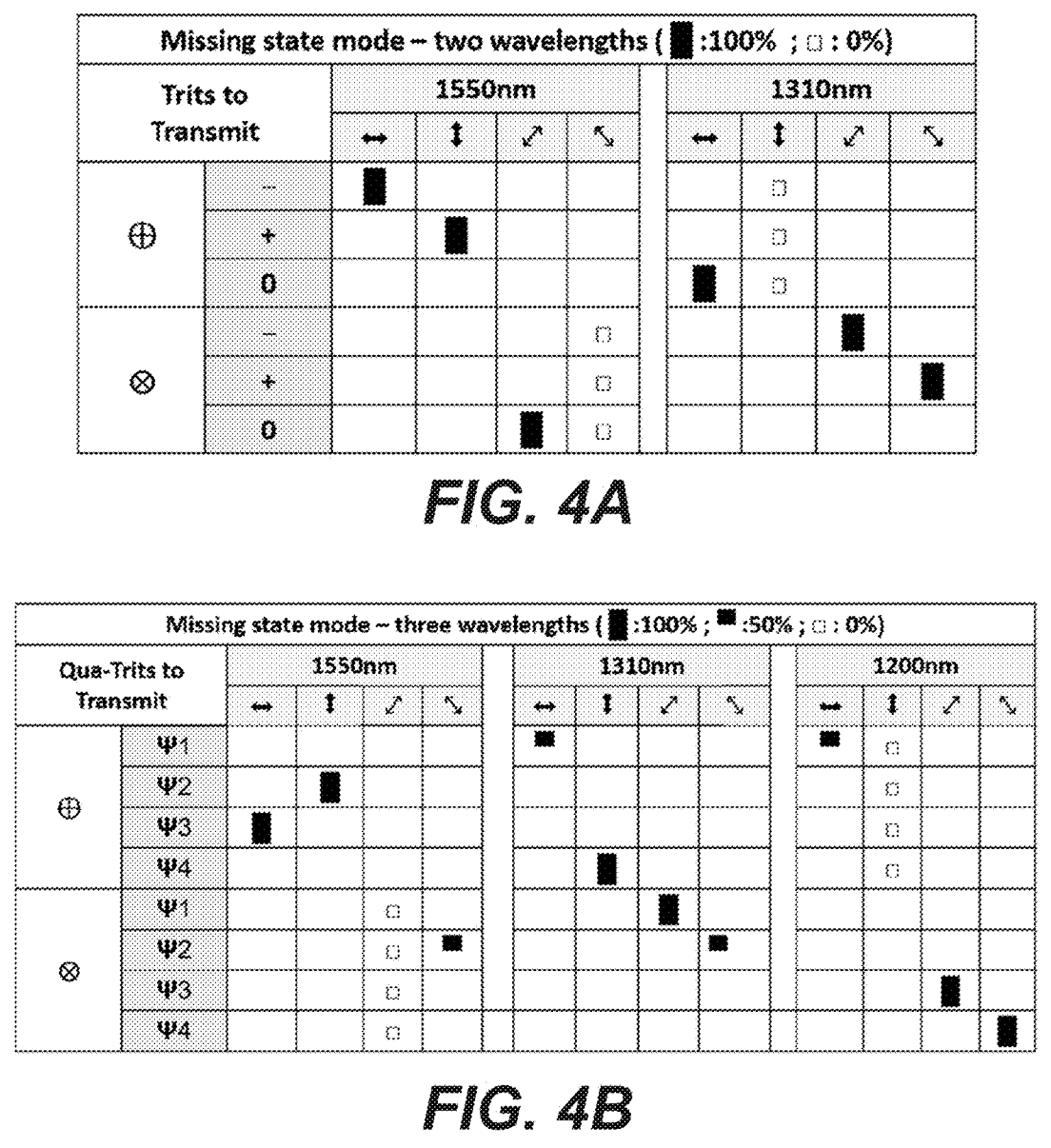

FIG. 4A illustrates an example scheme using two wavelengths that allows transmission of bits (encoded as trits) between Alice and Bob where Bob can detect eavesdropping without exchanging additional information with Alice. As will be explained, this scheme allows a single photon to represent each trit. In this scheme, a binary datastream of bits $\{0, 1\}$ is converted into a ternary datastream of trits $\{-, 0, +\}$ by adding random '0'-valued digits to the stream. The incoming bits $\{0, 1\}$ are directly converted into the ternary digit values $\{-, +\}$. The dual-wavelength QKD scheme described below is then used to transmit the trits along two possible bases '+', and 'x' as illustrated by Table IV below:

TABLE IV

|  | Wavelength | $\Psi_1$ | $\Psi_2$ | $\Psi_3$ |
|---|---|---|---|---|
| '+' Basis | $\lambda_1$ | → | ↑ |  |
|  | $\lambda_2$ |  |  | → |
| 'x' Basis | $\lambda_1$ |  |  | ↗ |
|  | $\lambda_2$ | ↗ | ↖ |  |

In this scheme, each of the three possible ternary digit values $\{\Psi_1, \Psi_2, \Psi_3\}$ are assigned a wavelength ($\lambda_1$ or $\lambda_2$) and a polarization orientation according to the table above, which is one suitable nonlimiting example. In this example, $\Psi_1$ is represented by a horizontally polarized photon at $\lambda_1$ in the '+' basis, while $\Psi_2$ is represented by a vertically polarized photon at $\lambda_1$. Meanwhile, the third state, $\Psi_3$, is represented by a horizontally polarized photon at $\lambda_2$. A similar encoding is used in the 'x' basis except the polarization orientations are rotated relative to those in the '+' basis and the wavelength choices are swapped. As a result of the swapped wavelength choices, an attacker who attempts to measure intercepted photons while randomly selecting a basis will be unable to use wavelength to determine the value encoded by any individual photon with certainty.

FIG. 4A is a concrete example of a suitable scheme along the lines of Table V, with additional details. With the basis '+', both trits $\{-, +\}$ are generated with the first wavelength (1550 nm in this example). The trits are sent oriented at 0° (→), and the trits '+' are sent at 90° (↑). The additional trits '0' are generated with the second wavelength (1310 nm in this example) and oriented at 0° (→). With the basis 'x', both trits $\{-, +\}$ are generated with the second wavelength (1310 nm in this example). The trits are sent oriented at 45° (↗), and the trits '+' are sent at 135° (↖). The additional trits '0' are generated with the first wavelength (1550 nm in this example) and oriented at 45° (↗). With the basis '+', the orientation at 90° (↑) of the second wavelength is never used; with the basis 'x', the orientation at 135° (↖) of the first wavelength is also never used. As a result, if Bob measures a signal indicating reception of a vertically polarized 1310 nm photon in the '+' basis, that photon can only have been produced by eavesdropping (or a system fault that renders the quantum channel unreliable). Similarly, if Bob measures a signal indicating reception of a 1550 nm photon oriented along the 135° direction ('↖') in the 'x' basis, that photon will also indicate either eavesdropping or a system fault. If eavesdropping occurs, Bob will detect that activity by detecting on average 25% of the '0'-valued digits with the wrong orientation. Thus, Bob can detect eavesdropping directly without exchanging additional information with Alice in real time, enhancing security.

As shown, in FIG. 4B, the polarization states assigned to a given digit value in each basis are indicated by a single mark indicating either "100%" or two marks indicating "50%." The pairs of "50%" marks indicates that one of the polarization states is used 50% of the time and the other polarization state is used 50% of the time for a given digit value, similarly to the states notated with asterisks in Table IV above. The states with marks indicating "0%" are those which will only be observed when eavesdropping or a system fault has altered the polarization of photons representing '0'-valued digits, producing erratic photons with the expected wavelength that do not have the expected polarization (i.e., the have an unexpected polarization) which cannot be the result of measurement error. In some embodiments a system may be configured to indicate that a transmission has been altered or otherwise corrupted if more than a predetermined number (or percentage) of photons are erratic.

The scheme described above in connection with FIG. 4A may be modified to support transmitting quaternary-coded ternary digits with single photons (with a fourth state reserved for error detection).

TABLE V

|  | Wavelength | $\Psi_1$ | $\Psi_2$ | $\Psi_3$ | $\Psi_4$ |
|---|---|---|---|---|---|
| '+' Basis | $\lambda_1$ |  | ↑ | → |  |
|  | $\lambda_2$ | →* |  |  | ↑ |
|  | $\lambda_3$ | →* |  |  |  |
| 'x' Basis | $\lambda_1$ |  | ↖ * |  |  |
|  | $\lambda_2$ | ↗ | ↖ * |  |  |
|  | $\lambda_3$ |  |  | ↗ | ↖ |

In the example of Table V, an asterisk indicates that more than one state (a combination of wavelength and polarization orientation) is used for a given quaternary digit value. When these multiple photon states are chosen randomly (i.e., each time a particular digit is transmitted, one of the two possible states is chosen randomly), then each wavelength will be used with equal frequency when the data are random (as is the case during QKD protocols such as BB84 that use randomly generated data to arrive at a shared key) and for a sufficiently large number of photons transmitted. In addition, the polarization states are assigned such that each polarization orientation is used with equal frequency when the data are random. It will be appreciated that Table V represents one suitable scheme for assigning polarization states to quaternary digit values and that polarization states may be assigned in any suitable manner. Thus, in this scheme corresponding proportions of the information to be transmitted are transmitted with each wavelength and with each possible polarization state.

FIG. 4B represents a specific example of such a scheme. In the example of FIG. 4B, the three wavelengths used are 1200 nm, 1310 nm, and 1550 nm. However, any suitable wavelengths may be used. As shown, in FIG. 4B, the polarization states assigned to a given digit value in each basis are indicated by a single mark indicating either "100%" or two marks indicating "50%." The pairs of "50%" marks indicates that one of the polarization states is used 50% of the time and the other polarization state is used 50% of the time for a given digit value, similarly to the states notated with asterisks in Table V above.

Because the schemes of FIGS. 4A and 4B rely on photon states that are allowed by the chosen polarization based but are never used to transmit information, they do not maximize entropy. In some applications it may be desirable to utilize all possible photons states and to do so with at least approximate equal frequency. U.S. patent application Ser. No. 16/372,231 discloses systems and methods that use shared information (a "key") between Alice and Bob to enable Alice to embed information that Bob may use to detect transmission errors indicative of eavesdropping without requiring the use of "missing" polarization states as described above.

For example, an incoming datastream of bits with digit values {0, 1} may be converted into a ternary-coded binary datastream of trits having only two-digit values {–, +}, then combined with a ternary shared key to generate a complete ternary datastream including all possible digit values {–, 0, +}. Quaternary values are shown as bit pairs. However, as described further below, quaternary values may be transmitted directly using single photons according to embodiments herein. In systems in which quaternary data is transmitted natively, steps involving conversion of data to bit pairs may be omitted. Similarly, the technique described in connection with the example below can be applied to transforming binary data in ternary data, as well as transformed any data expressed in a first radix to data expressed in a second, higher radix. In some embodiments, a string of key values may be inserted, appended, or interleaved with the message to be transmitted in order to produce the datastream to be transmitted that contains all possible digit values in the chosen radix.

Figures 5A, 5B, 5C:
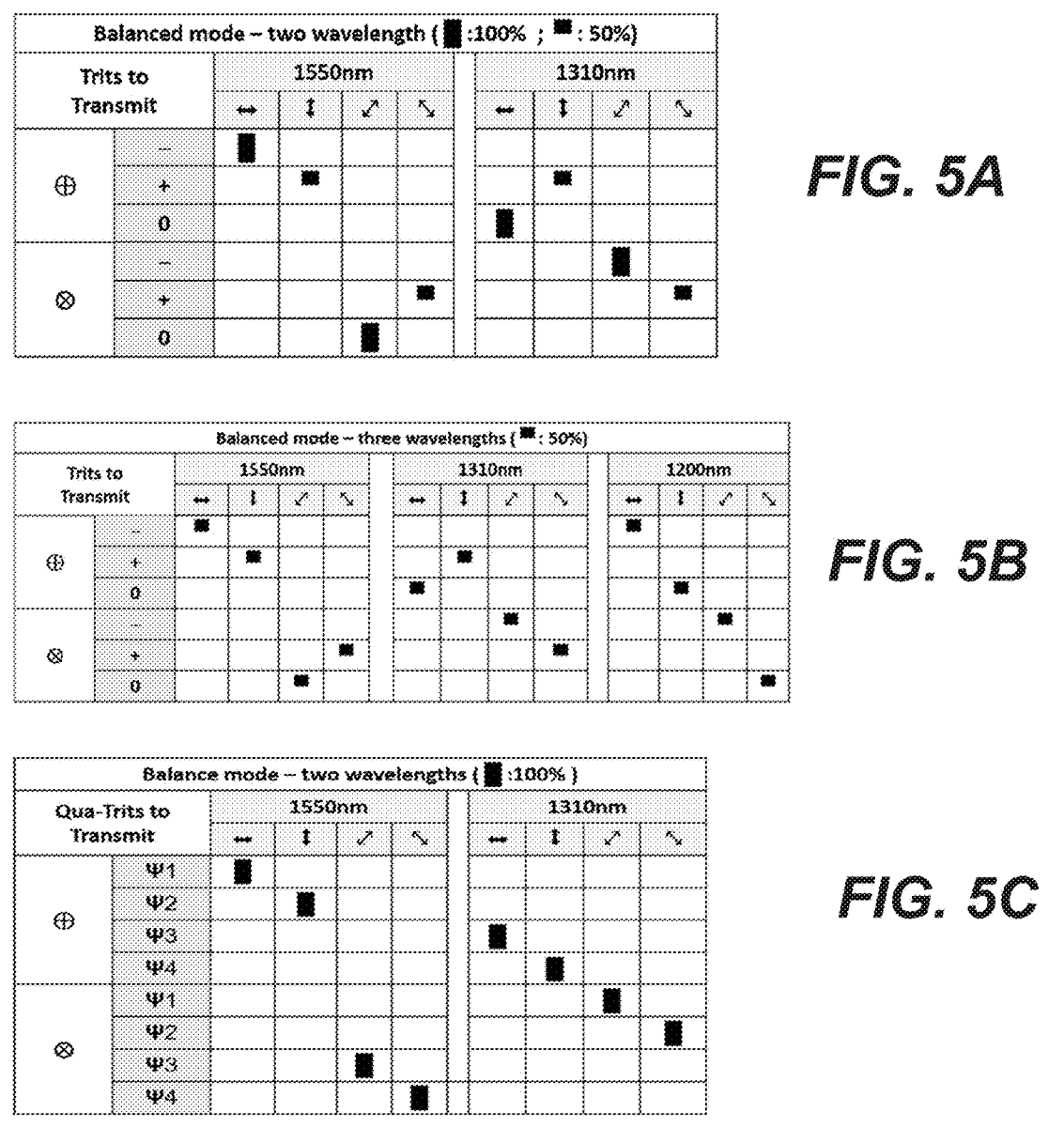

FIGS. 5A, 5B, and 5C illustrate multi-wavelength polarization schemes which utilize all possible states equally. These schemes may be combined with methods discussed below in connection with FIGS. 6-8.

FIG. 5A represents an example two-wavelength polarization scheme for representing ternary digits with digit values {$\Psi_1$, $\Psi_2$, $\Psi_3$} using single photons, although in some applications "packets" of identically polarized photons may also be used. As above, at least one of the three ternary digital values is assigned more than one polarization state in order to ensure that each wavelength is used approximately one half of the time (assuming the data transmitted are random). Table VI is a generalized example of one suitable polarization encoding scheme.

TABLE VI

|  | Wavelength | $\Psi_1$ | $\Psi_2$ | $\Psi_3$ |
|---|---|---|---|---|
| '+' Basis | $\lambda_1$ | → | ↑* |  |
|  | $\lambda_2$ |  | ↑* | → |
| 'x' Basis | $\lambda_1$ |  | ↖ * | ↗ |
|  | $\lambda_2$ | ↗ | ↖ * |  |

As shown in FIG. 5A, in the '+' basis the ternary digit value is represented by a photon having the first wavelength (1550 nm in this example) and having its polarization oriented at 0° (→), and the half of the trits '+' are represented by photons with polarizations oriented at 90° (↑). The other half of the '+' trits are represented with photons having the second wavelength (1310 nm in this example) with their polarizations also oriented at 90° (↑). The additional '0' trits are represented by photons with polarizations oriented at 0° (→). In the 'x' basis the '−' trits are represented by photons having the second wavelength (1310 nm in this example) and polarizations oriented at 45° (↗). Half of the '+' trits '+' are represented by photons having polarizations oriented at 135° (↖). The additional '0' trits are represented by photons having the first wavelength (1550 nm in this example) and polarizations oriented at 45° (↗). The second half of the '+' trits have polarizations oriented at 135° (↖). The decision whether to generate photons representing the '+' trits using the first wavelength or the second wavelength may be random. After combining the correctly-measured portion of the datastream with the key, only the ternary digit values '−', and '+' should occur, unless eavesdropping occurs.

FIG. 5B represents an example three-wavelength polarization scheme for representing ternary digits with digit values $\{\Psi_1, \Psi_2, \Psi_3\}$ with single photons, although in some applications "packets" of identically polarized photons may also be used. In this example, each state is assigned two possible polarization states in order to ensure that each wavelength is used approximately one third of the time (assuming the data transmitted are random). Table VI is a generalized example of one suitable polarization encoding scheme.

TABLE VII

| | Wavelength | $\Psi_1$ | $\Psi_2$ | $\Psi_3$ |
|---|---|---|---|---|
| '+' Basis | $\lambda_1$ | →* | ↑* | |
| | $\lambda_2$ | | ↑* | →* |
| | $\lambda_3$ | →* | | ↑* |
| 'x' Basis | $\lambda_1$ | | ↖* | ↗* |
| | $\lambda_2$ | ↗* | ↖* | |
| | $\lambda_3$ | ↗* | | ↖* |

As shown in FIG. 5B, each of the three possible wavelengths has the potential to generate two trits, and this for each basis of transmission. Each trit can be transmitted with equal probability from two different wavelengths. Each wavelength is used one-third of the time. As done with the first example, the concatenation with shared keys can enhance security.

FIG. 5C represents an example three-wavelength polarization scheme for representing ternary digits with digit values $\{\Psi_1, \Psi_2, \Psi_3\}$ with single photons, although in some applications "packets" of identically polarized photons may also be used. In this example, each state is assigned two possible polarization states in order to ensure that each wavelength is used approximately one third of the time (assuming the data transmitted are random). Table VI is a generalized example of one suitable polarization encoding scheme.

TABLE VIII

| | Wavelength | $\Psi_1$ | $\Psi_2$ | $\Psi_3$ | $\Psi_4$ |
|---|---|---|---|---|---|
| '+' Basis | $\lambda_1$ | → | ↑ | | |
| | $\lambda_2$ | | | → | ↑ |
| 'x' Basis | $\lambda_1$ | | | ↗ | ↖ |
| | $\lambda_2$ | ↗ | ↖ | | |

Figure 7:
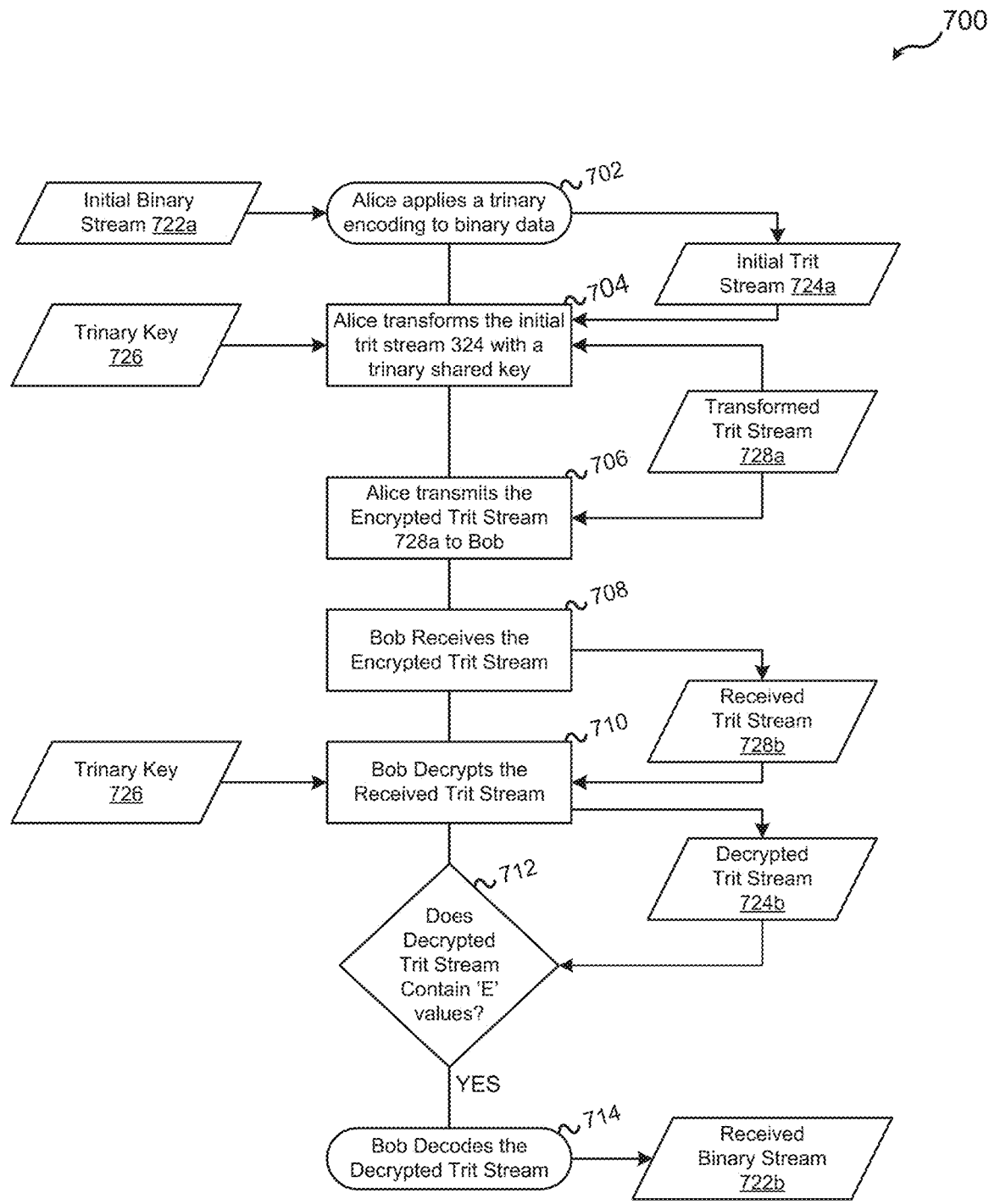
FIG. 7 depicts a flow chart of another example quantum key distribution protocol using ternary states and shared keys.

As shown in FIG. 5C, a ternary datastream of trits with digit values $\{-, 0, +\}$ is converted into a quaternary datastream of quatrits with digit values $\{\Psi1, \Psi2, \Psi3, \Psi4\}$, by converting $\{-, 0, +\}$ into $(\Psi1, \Psi2, \Psi3)$ and adding random Ψ4-valued digits to the stream. The resulting stream of quatrits is combined with a quaternary shared key before transmission through the quantum channel. The quatrits are transmitted through a dual wavelength based QKD scheme as shown in the example of FIG. 7. Upon receipt, the receiving party combines the portion of the stream received with the correct measurement basis with key to reconstruct that portion of the ternary stream. Ψ4-valued digits are only present in case of eavesdropping activity, which makes the protocol secure. A variation of this protocol is to use the first three quatrits to transmit trits and use the last quatrit as sensor of eavesdropping activity, following a sequence agreed upfront by the communicating parties.

Figure 6:
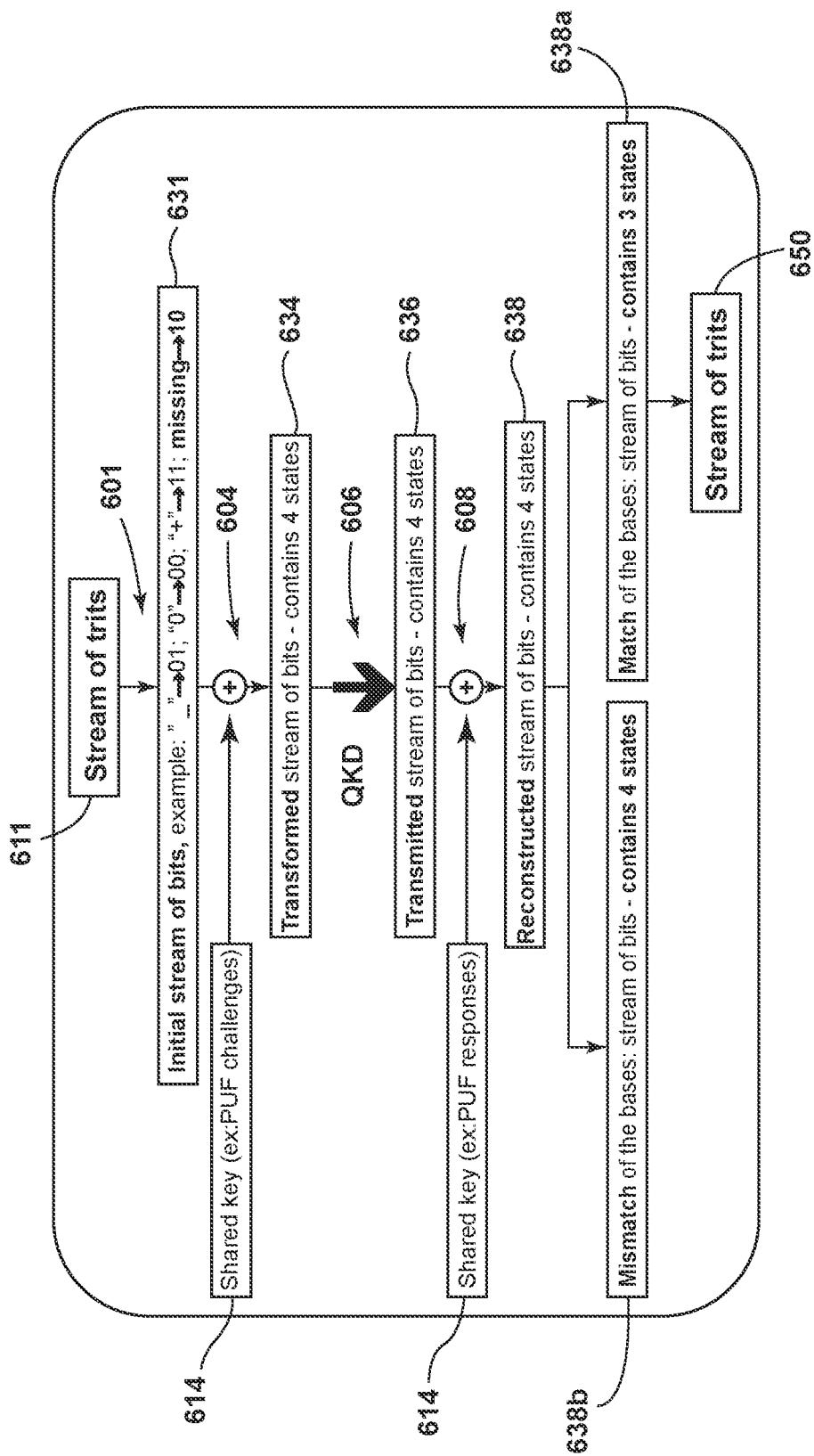
FIG. 6 depicts a flow chart of an example quantum key distribution protocol using ternary states and shared keys.

FIG. 6 is a flowchart illustrating an example procedure 600 for transmitting a message using embodiments disclosed herein, such as example communication system 100A and/or example communication system 100B. The example procedure 600 is described in the context of a system that uses pairs of photons to transmit binary-coded ternary data that is transformed into binary-coded quaternary data. It will be understood that in systems and methods such as those described above using two or more wavelengths, the binary-coded quaternary data may be transmitted directly using single photons that encode quaternary values instead.

Initially, the message or key to be distributed in this example is provided as a stream of ternary digits ("trits"), i.e., trit stream 622. In some embodiments, the trit stream 622 is generated by processing circuitry such as processing circuitry 110A belonging to communication system 100A of FIG. 1. Because the trit stream 622 is composed of ternary digits, each position in the stream is occupied by one of the three possible ternary digit values $\{-, 0, +\}$.

At step 602, each trit in the trit stream 622 is converted to a binary representation to produce a bit stream 632 (otherwise referred to as an encoding of the message or an encoded message). Because a binary digit (a bit) can only have one of two values $\{0, 1\}$, two bits are required to represent all possible values of a trit. For example, the binary trit '−' is represented in binary by '01', the trit '0' is represented by '00', and the trit '+' is represented in binary by '11.' Note that the mapping between trits and pairs of bits is arbitrary. The important feature is that each possible trit is represented by a unique binary string. Recall that two bits can represent up to four unique values: $\{00, 01, 10, 11\}$. Thus, in our example, the bit string '11' is not assigned to any possible trit.

At step 604 a secret shared key 624 shared between the sender and receiver is used to encrypt the initial bit stream 432 to produce a transformed bit stream 634. In one embodiment, the transformed bit stream 634 is the result of applying an XOR function to the key 424 and the initial bit stream 632. In certain embodiments to be described below, addressable PUF technology is used to share the shared key 624 securely. In alternate embodiments, the shared key 624 is generated using shared random numbers which address lookup tables of key values.

In an example, the shared key 624 is composed of the following bit pairs (01, 01, 00, 10, 01, 01, 11) and the initial stream of bit pairs 632 is (01, 01, 00, 00, 10, 01, 01, 11) If the transformation used is an XOR function, then the resultant transformed bit stream 434 is:

(11000111001100001)⊕(0101000010010111)= (1001011110100110)

At step 606, the bit stream 634 is transmitted over a channel such as that specified in the BB84 Quantum key distribution (QKD) protocol. Similarly, to BB84, the sender randomly chooses between two sets of basis states (e.g., the '+' basis or the 'x' basis). However, in this instance, the procedure is modified so that each binary-encoded ternary value is transmitted using the same basis. In other words, the sender randomly selects a new basis for every two bits instead of for each individual bit. This maintains the traceability of the transmitted bit pairs.

At step 608, the transmitted bit stream 636 is reconstructed using the same shared key 624 and an XOR operation. Recall that, in the example, the shared key is (01, 01, 00, 00, 10, 01, 01, and 11). Applying the XOR function to the key and the bit stream 636 we produce the reconstructed bit stream 638 (11, 00, 01, 11, 00, 11, 00, 01)⊕(01, 01, 00, 00, 10, 01, 01, 11)=(10, 01, 01, 11, 10, 10, 01, 10), which may also be referred to as the decoded message.

Next, Alice and Bob exchange information identifying which bases were used for transmission and detection. Bob then produces bit streams 638*a* and 638*b*. Bit stream 638*a* corresponds to bit pairs measured when Alice and Bob used the same basis. Bit stream 638*b* corresponds to bit pairs measured when Alice and Bob used different bases. When the binary datastream 638*a* measured with matching bases is retrieved, no errors are anticipated (or, if there is sufficient noise, a low error level); the final stream of trits is generated and used to communicate over the channel. For the non-matching positions, a high error rate is anticipated. Bob ignores these bits. Statistically, 25% of the pairs have the value (10) which is not associated with one of the possible trit values.

For example, if the matching positions are 1, 2, 4, and 7, then the binary stream is (11, 00, 11, 00) and the ternary stream is (+, 0, +, 0). In this example, the non-matching positions are 3, 5, 6, 8; the binary stream is (01, 11, 10, 10) and the ternary stream is (−, +, 0, 0). If an eavesdropper ("Eve") intercepts the communication between Alice and Bob, Eve will disturb qubits transmitted through the quantum optical channel. When Alice and Bob's bases are not aligned, the effect of Eve's eavesdropping will not be detected. However, when Alice and Bob's bases are aligned, no errors (or a very low error rate in the presence of noise sources) are expected. The insertion of a polarizer during eavesdropping randomly disturbs the qubits when the Eve's basis is misaligned with Alice and Bob's bases. This happens approximately 50% of the time; in this case, 25% of the pairs cannot be associated by Bob as valid trits. Altogether, during eavesdropping, 12.5% of the stream having aligned bases cannot be associated with valid trits which is an error rate that is usually well outside the acceptable range; this is easily detectable by Bob. Without exchanging the value of a stream of bits Alice, Bob knows that he is under attack by tracking the error rates.

Table X below illustrates Alice converting a trit string to a bit stream, encrypting the result with a shared key, and transmitting the encrypted string to Bob, as well as the process of Bob decoding the string. The effect of eavesdropping by Eve is also illustrated. Each column of Table X represents one trit value in a string of 8 trits, in order of position in the string, indicated by row labeled the "Position." Row by row, the table illustrates the various transformations undergone. Thus, the trit string is given by the entries in the "Trit Value" row (+0−+0+0−), reading from position 1 to position 8.

TABLE IX

| Position: | 1 | 2 | 3 | 4 | 5 | 6 | 7 | 8 |
|---|---|---|---|---|---|---|---|---|
| Trit value: | '+' | '0' | '−' | + | '0' | '+' | '0' | '−' |
| Binary-encoded Trit: | 11 | 00 | 01 | 11 | 00 | 11 | 00 | 01 |

TABLE IX-continued

| Position: | 1 | 2 | 3 | 4 | 5 | 6 | 7 | 8 |
|---|---|---|---|---|---|---|---|---|
| Shared key: | 01 | 01 | 00 | 00 | 10 | 01 | 01 | 11 |
| Transmitted Bit Pair: | 10 | 01 | 01 | 11 | 10 | 10 | 01 | 10 |
| Alice's Basis | + | x | + | + | x | + | x | x |
| Eve's Basis | x | x | + | x | + | + | + | x |
| Bob's Basis | + | x | x | + | + | x | x | + |
| Expected bit stream: | 10 | 01 | 01 | 11 | 01 | 11 | 01 | 01 |
| Actual bit stream received: | 11 | 01 | 00 | 01 | 11 | 01 | 10 | 01 |
| Shared key: | 01 | 01 | 00 | 00 | 10 | 01 | 01 | 11 |
| Expected reconstruction: | 11 | 00 | 01 | 11 | 11 | 10 | 00 | 10 |
| Actual reconstruction: | 10 | 00 | 00 | 01 | 01 | 00 | 11 | 10 |
| Expected trit values: | '+' | '0' | '−' | '+' | '+' | '−' | '0' | '−' |
| Actual trit values: | '0' | '0' | '0' | '−' | '−' | '0' | '+' | '0' |

Referring to position 1 for the example in Table IX, the initial trit value is '+', which is transformed into the bit pair '01'. The XOR of the bit pair and the corresponding portion of the shared key is '10'. Alice transmits '10' using the '+' polarization basis, which is intercepted by Eve using the 'x' polarization basis. Because Bob chose the wrong basis, but Eve chose the wrong one, Bob will measure random values instead of the expected ones. In this example, Bob measures '11' instead of '10', before applying the shared jet to generate a reconstructed value of '10' instead of the expected value of '11'. Converting back to a trit stream, Bob measures '0' instead of the expected value of '+'.

The row labeled "Binary-encoded Trit" gives the binary-encoding value for the given trit. The row labeled "shared key" gives the portion of the shared key corresponding to the given position in the trit stream. The row labeled "Transmitted Bit Pair" gives the result of encrypting the bit stream with the shared key for each position (the XOR of the binary-encoded trit value and the corresponding portion of the shared key, in this example). Table IX also has rows for Alice's choice of polarization basis when transmitting each bit pair, as well as the corresponding randomly chosen bases for Eve and Bob. The row labeled "Expected bit stream" indicates the value of the bit stream expected if Bob chooses the correct measurement basis. The row labeled "Actual bit stream received" indicates the bit stream values received by Bob given Bob's randomly chosen measurement basis and given the presence of Eve and Eve's randomly chosen measurement basis. The row labeled "Expected reconstruction" shows the expect bit values if Bob had chosen the right basis and if Eve was not present after decryption with the shared key (repeated for clarity). The row labeled "Actual reconstruction" shows the result of Bob decrypting the actual received bit stream with the shared key. Finally, the table includes rows for the trit values expected if Bob chose the correct basis and Eve was not present, contrasted with the actual trit values recovered.

FIG. 7 illustrates an example protocol 700 for transmitting binary data in the embodiment above. First, at step 702 Alice converts an initial binary stream 722*a* into an initial trit stream 724*a* containing exclusively and '+' states. For example, the binary value '0' is encoded as the ternary value and the binary value '1' is encoded as the ternary value '+'. For instance, the binary string (0110110010101101)₂ is encoded as the ternary string (−++−++−−+−++−+−+). Note that the ternary value '0' does not appear because the ternary state '0' is not used in the encoding transformation.

Next, at step 704, the Alice encrypts the initial trit stream 724*a*. As an example, the string of trits is added, modulo-3, with a ternary key 726 produce a transformed trit stream 728*a*. As an example, if initial trit stream 724*a* is (−++−++−−+−++−+−+) and the ternary key 726 is (0++−0

0+----+0-++0), then the sum of the two, modulo-3 is the transformed trit stream 728a with values (---+++0+ 0+-++-0+). At step 706, Alice transmits the transformed trit stream 728a using the photon polarizations described above.

At step 708, Bob receives the transformed trit stream 728a after transmission by Alice as the received trit stream 728b and proceeds to decrypt at step 710 using the ternary key 726 which is shared between Alice and Bob. In this example, Bob adds the ternary key 806 and the received trit stream 728b twice to decrypt the received trit stream 728b, producing the decrypted trit stream 824b. Triple addition modulo-3 of the ternary key 726 is a neutral operation; therefore, the decrypted trit stream 824b will be identical to the initial trit stream 824a if no errors have been introduced during transmission. When Alice and Bob's bases are aligned, Bob should not detect the ternary value '0' in the resulting stream of trits; only '-' and '+' are expected. '0' values will be only detected in case of eavesdropping or another source of transmission errors.

At step 812, Bob checks to see if the decrypted trit stream 824b contains any '0' values. When eavesdropping occurs, one third of the trits can be '0' when Alice and Bob's bases are aligned, which is very high. The error rate will be lower in case of a partial interception of the stream; however, if the number N of trits transmitted per stream is low enough, partial interception will be also highly erratic for Eve. If the decrypted trit stream 824b does not contain any '0' values, Bob can proceed to step 714 to decode the decrypted trit stream 824b to produce the received binary string 722b.

As disclosed above, the protocols above can be generalized to channels which support transmitting quaternary digits or digits in higher radixes. To illustrate we now discuss a system supporting four possible values per digit, $\{\Psi_0, \Psi_1, \Psi_2, T_3\}$. In this example, an incoming stream of trits is converted into quaternary digits. The ternary value '-' is mapped to $\Psi_0$, the ternary value '0' is mapped to $\Psi_1$ and the ternary value '+' is mapped to $\Psi_2$. The value $\Psi_3$ is not used in the encoding transformation. Note that, as above, the key may contain all four possible quaternary values. This prevents Eve from determining that the quaternary encoding of the transmitted message cannot contain the fourth quaternary value.

As above, the quaternary representation of the message is transformed (i.e., encrypted) using the shared key to produce a transformed stream. The incoming stream of quaternary digits is produced, for example by adding the stream with the key, modulo 4 (e.g., $\Psi_0+\Psi_1=\Psi_3$; $\Psi_0+\Psi_2=\Psi_2$; $\Psi_0+\Psi_3=\Psi_0$; $\Psi_2+\Psi_2=\Psi_0$), as illustrated below:

tional quantum communication protocols and does not require Alice and Bob to exchange additional information in order to detect an eavesdropper.

The methods presented herein can be generalized to different arithmetic bases as long as two different arithmetic bases are involved in the protocol and when shared keys exchanged between the communicating parties are used to transform and reconstruct (i.e., encrypt and decrypt) the data as disclosed herein. Thus, in the case of binary-coded data, use of the XOR function as described above is a non-limiting example of a suitable encryption transformation and a second application of the XOR function using the shared key is a non-limiting example of a suitable decryption transformation. Similarly, in the case of ternary-coded data, modulo-3 addition using the shared key as described above is a non-limiting example of a suitable encryption transformation and double modulo-3 addition with the shared key is a non-limiting example of a suitable decryption transformation.

Figure 8:
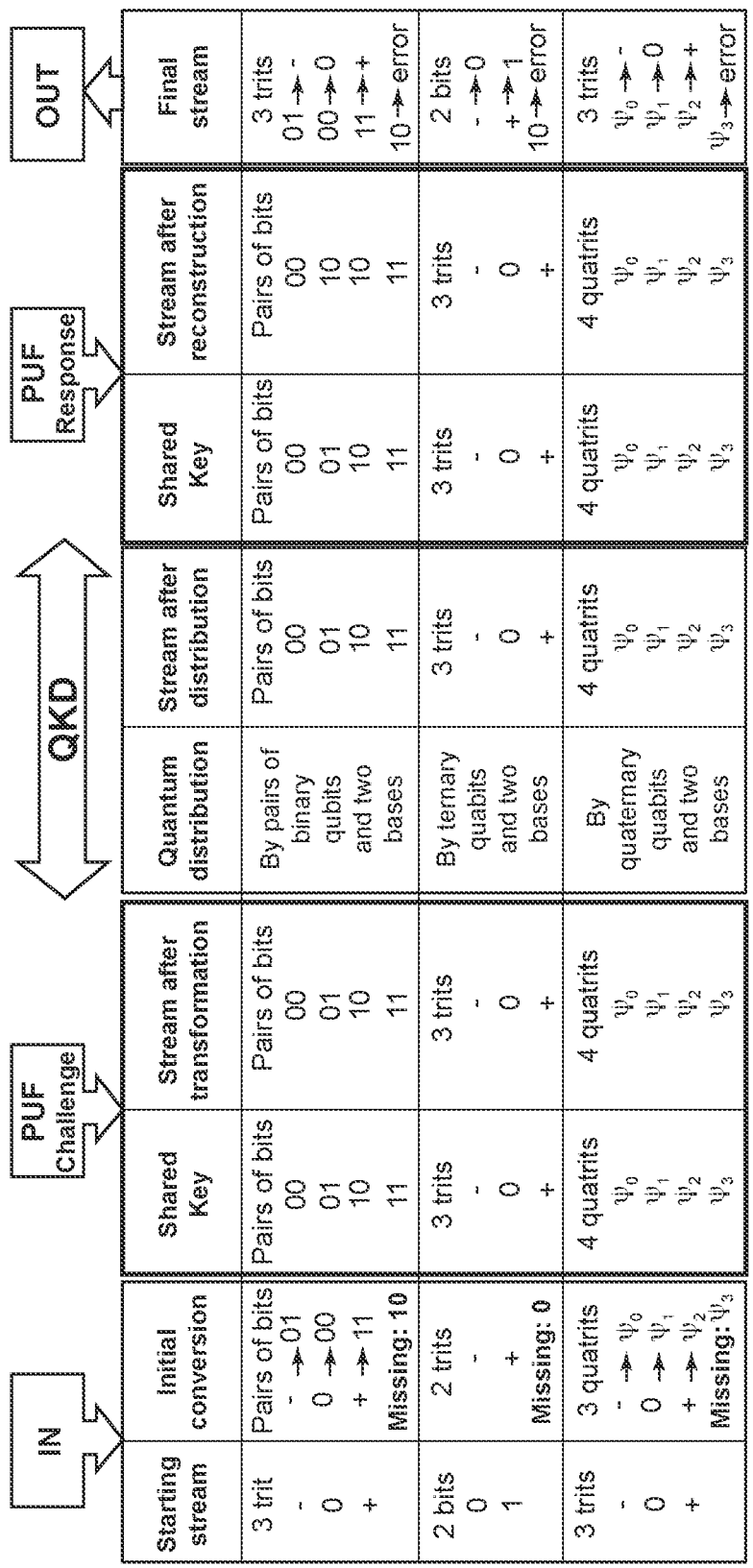
FIG. 8 depicts a summary of features of three encoded methods suitable for use with systems and methods herein.

FIG. 8 is a table summarizing communication protocols disclosed herein for three exemplary embodiments across each of the three respective rows, labeled I, II, and III. The column labeled "starting stream" indicates the format of the initial data. The column labeled "starting stream" indicates the format of the stream after the initial encoding. The "shared key" column describes the format of the shared key. The "stream after transformation" column indicates the format of the data after transformation (encoding) with the shared key, and so on. For example, row I summarizes an embodiment where the initial stream is composed of trits having any of three values from the set $\{-, 0, +\}$. Each trit in the initial stream is represented as a bit pair. In this embodiment, the encoding never produces the bit pair '10'. The shared key is also composed of bit pairs, but the shared key may have any of the possible bit pairs $\{00, 01, 10, 11\}$. After transformation with the shared key, the data is a set of bit pairs have any of the four possible values (thus rendering the exclusion of '10' by the initial conversion undetectable to an eavesdropper). The transformed bit stream is then transmitted one bit-pair at a time over a quantum channel in one of two possible states relative to one of two polarization bases (for a total of four possible polarizations), as described above. The receiver receives a stream of bit pairs, after reconstruction with the shared key, the reconstructed stream is a stream of bit pairs which will only contain the value '10' when there has been a transmission error that may be used to detect eavesdropping.

| Initial Stream | $\Psi_2$ | $\Psi_2$ | $\Psi_0$ | $\Psi_1$ | $\Psi_1$ | $\Psi_2$ | $\Psi_2$ | $\Psi_0$ | $\Psi_0$ | $\Psi_1$ | $\Psi_0$ | $\Psi_1$ | $\Psi_1$ | $\Psi_0$ | $\Psi_2$ | $\Psi_1$ |
|---|---|---|---|---|---|---|---|---|---|---|---|---|---|---|---|---|
| Shared Key | $\Psi_1$ | $\Psi_0$ | $\Psi_2$ | $\Psi_0$ | $\Psi_2$ | $\Psi_2$ | $\Psi_0$ | $\Psi_1$ | $\Psi_1$ | $\Psi_3$ | $\Psi_2$ | $\Psi_2$ | $\Psi_0$ | $\Psi_0$ | $\Psi_1$ | $\Psi_3$ |
| Transformed Stream | $\Psi_3$ | $\Psi_2$ | $\Psi_2$ | $\Psi_1$ | $\Psi_3$ | $\Psi_0$ | $\Psi_2$ | $\Psi_1$ | $\Psi_1$ | $\Psi_0$ | $\Psi_2$ | $\Psi_3$ | $\Psi_1$ | $\Psi_0$ | $\Psi_3$ | $\Psi_0$ |

After Alice transmits the quaternary digits over the quantum channel, Bob reconstructs the quaternary message stream. Without eavesdropping, the portion of the stream that was transmitted with Alice and Bob's bases aligned should consist only of the quaternary digits $\{\Psi_0, \Psi_1, \Psi_2\}$. When Eve intercepts the transmission and her basis is misaligned (which will happen with a probability of 50% for each quaternary digits) the quaternary value $\Psi_3$ will be measured by Bob 25% of the time, which is easily detected. This protocol can achieve twice the throughput of conven- Similarly, the row labeled II represents an embodiment where binary data is converted into trits where only two of three possible trit values are produced by the conversion transformation. After transformation with a ternary key which may contain any of three possible trit values, the stream is a stream of trits which may contain any of the three possible values. The stream is transmitted over a quantum channel (or other channel with equivalent properties) which natively allows for ternary signals using 3 states. After reconstruction with the shared key, the stream is a ternary stream where the binary values are represented using only two of the three possible trit values. Any presence of the ternary value '0' (elsewhere denoted by '0') indicates a transmission error that may be used to detect eavesdropping.

Finally, the row labeled III represents a system where ternary data is encoded in a quaternary format and transmitted over a channel allowing native transmission of quaternary signals. The reconstructed stream is quaternary, where any presence of the quaternary value Ψ3 indicates a transmission error that may be used to detect eavesdropping.

Figure 9:
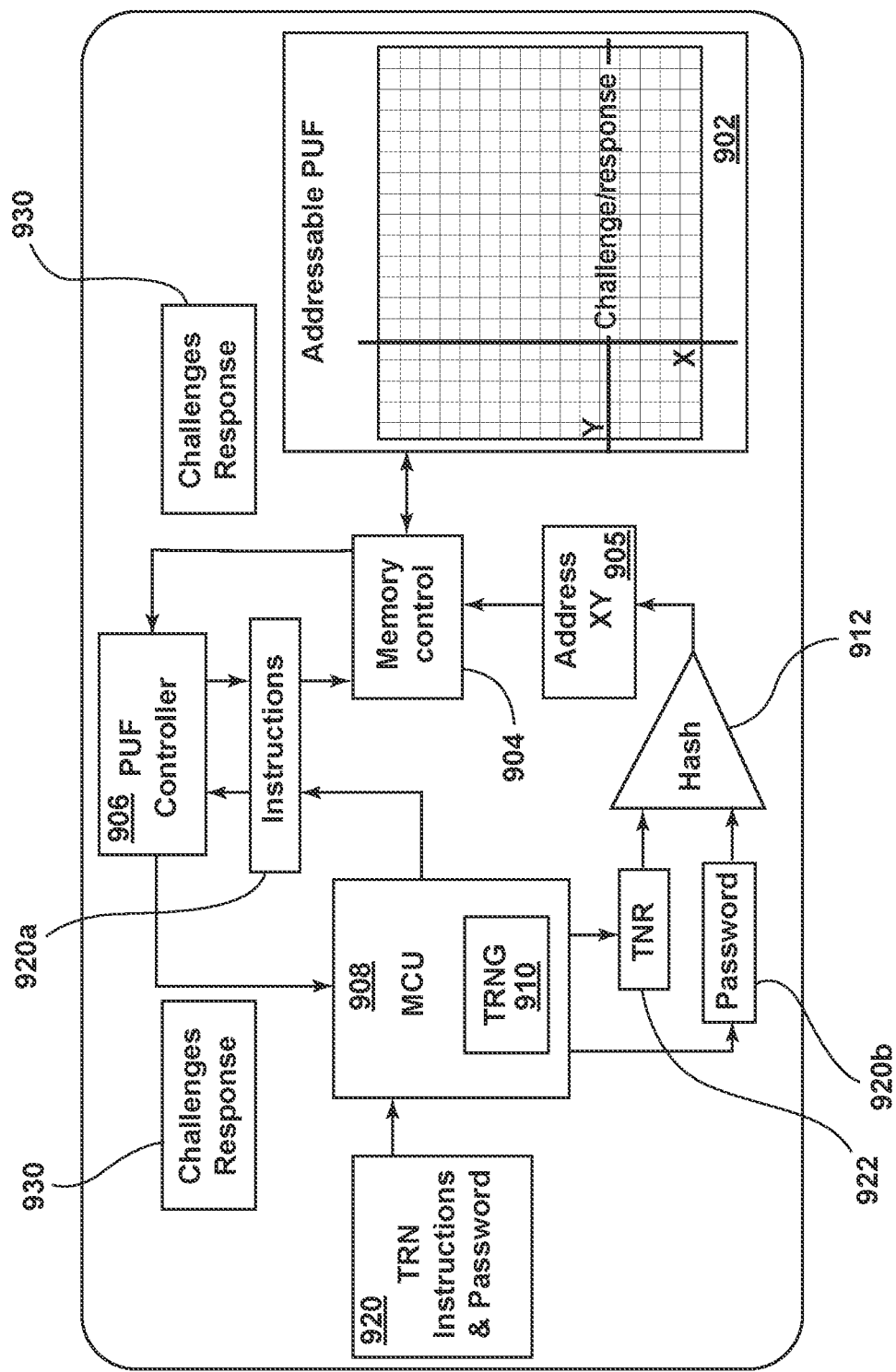
FIG. 9 depicts a block diagram describing a system for generating a shared key utilizing an addressable PUF array.

FIG. 9 illustrates an architecture suitable for securely sharing a key using an addressable PUF array 902 without requiring the shared information to be transmitted over a potentially insecure channel. The PUF array 902 (shown here as a 2D-array of cells) can be addressed using a memory controller 904, which receives a specified address 905. The memory controller 904 is configured to return characteristics of the PUF array 902 at the address 905, as challenge response 930. The challenge responses 930 may be specific characteristic of queried cells (or ranges of cells) or may be derived from those characteristics. Non-limiting examples of such characteristics are time delays of transistor-based ring oscillators and transistor threshold voltages. Other non-limiting examples include optical devices. For example, Bob may possess an optical PUF device which, when illuminated by a light source such as a laser produces a unique image. This image may be digitized, and the pixels may be used to form an addressable PUF array.

In this example Bob possesses a PUF such as PUF array 902. Upon activation, Bob needs to securely exchange with Alice (or another party from which Alice can securely retrieve information), the measurements of physical elements describing the PUF (or information derived from those measurements). This can be a set of parameters, P, produced by measuring each cell of the PUF array 902. A request to measure the parameters and/or perform further mathematical operations on those parameters may be variously referred to as "authentication challenges" or "challenges." The initial measurements of the PUF, may be various referred to as "authentication challenge responses," "challenge responses," or simply "responses." Using this terminology, Alice (or another party) generates a set of challenges during an initialization process and issues to challenges to Bob (or a party in possession of Bob's PUF at the time of the initialization). The responses obtained to the initial challenges are stored for reference by Alice. When Alice subsequently sends Bob a challenge, Bob can independently re-measure the parameter(s) P at the specific locations of his PUF array to generate appropriate challenge responses. Challenges and the corresponding challenge responses represent a fingerprint of the PUF. With quality PUFs, the hamming distance between challenges and responses is small.

As shown in FIG. 9, the challenges are generated by supplying a message 920 (which includes instructions 920a and a password 920b) to a microcontroller 908. The microcontroller 908 contains a random number generator such as the true-random-number generator (TRNG) 210, which sends the instructions 920a, which specify how to generate the challenge responses 930 to the memory controller 904. The memory controller 904 receives the instructions 920a and the desired address 905 to query. The desired address 905 is generated by a hash function 412 which hashes the combined password 920b and random number 922 to yield the address 905. Using the instructions 920a and the address 905, the memory controller 904 retrieves the appropriate challenge response 930 and delivers it to the memory controller 904, which delivers the appropriate challenge response 930 to the microcontroller 908. In this example, all possible challenges are issued in advance and the challenge responses 930 are stored by the microcontroller 908 in a lookup table prior to Alice and Bob communicating using the protocols described earlier. In certain preferred embodiments, the PUF array 902, and memory controller 904 are possessed by the receiver (Bob) while the microcontroller 908 is possessed by the transmitting party (Alice).

In some instances, Alice and Bob parties may have the same random number generator as well as shared multifactor authentication keys such as passwords and a set of instructions. The random number and instructions identify the challenge and PUF elements to use to generate response. Alice already knows the challenge response because she has stored the response of Bob's PUF generated during the initialization process. Bob re-measures his PUF and re-generates the challenge response. The challenge response can therefore be used as a shared key in the protocol without requiring the key to be exchanged between Alice and Bob during the communication session.

A hostile party will not be able to read a tamper-proof PUF. Low power PUFs need only one femtojoule (fJ) to read a response which is below the noise level of any side channel attack. The hash function is a one-way cryptographic function preventing any party to find the input of the hash from the output (i.e., the message digest). Therefore, a third party cannot know which random number is associated with a portion of the array. Challenge-response-pair (CRP) error rates after error correction below 0.1% are sufficient to implement the protocols described above.

It should be understood that although example embodiments discussed above have particular features, the invention disclosed herein is not limited to a specific implementation of those features. For instance, various examples describe particular encodings that map polarization states to digit values. However, any suitable encodings may be used. Along these lines, various examples describe using a particular digit value (e.g., a ternary '0') for error correction purposes. However, any digit value may be selected for this purpose. Various examples use specific wavelengths or particular photon-generation and detection devices. However, any suitable devices may be used. For instance, a laser and variable optical attenuator may be replaced by an actual single photon source. In addition, although some examples mention the use of single photons, some embodiments may use multiple identical are substantially identical photons to represent a unit of information such as a bit, trit, or quaternary digit and the like.

The invention claimed is:

1. A method, comprising:
    receiving incoming photons representing digit values of a datastream that includes at least three distinct digit values, the incoming photons including photons having a first wavelength and photons having a second wavelength;
    selecting between first and second measurement bases for each photon, each measurement basis defining a pair mutually orthogonal polarization axes;
    performing a polarization measurement on each photon that determines a polarization axis of that photon in the measurement basis selected for that photon and a wavelength of that photon; and
    decoding the datastream using the wavelength and polarization of each of the polarized photon, including generating a signal indicating whether at least a portion of the datastream was altered;

wherein the first measurement basis defines, for each of the first and second wavelengths, a first polarization axis in a plane for that wavelength and a second polarization axis in that plane that is perpendicular to the first polarization axis for that wavelength;

wherein the second measurement basis defines, for each of the first and second wavelengths, a third polarization axis in the plane for that wavelength and a fourth polarization axis in the plane for that wavelength that is perpendicular to the third polarization axis for that wavelength; and wherein the third and the fourth polarization axes for each wavelength are equally-weighted vector combinations of the first and second polarization axes for that wavelength.

2. The method of claim 1, wherein decoding the datastream using the wavelength and polarization of each of the polarized photon comprises:

performing the polarization measurement on a first portion of the incoming photons according to the first measurement basis and on a second portion of the incoming photons according to the second measurement basis for each wavelength;

determining, according to the polarization measurement, a number erratic of photons of the first portion having the second wavelength having a measured polarization axis that differs from an expected polarization axis of the first measurement basis for the second wavelength;

determining, according to the polarization measurement, a number of erratic photons of the second portion having the first wavelength that have a measured polarization axis that differs from an expected polarization axis of the first measurement basis for the second wavelength; and wherein generating the signal indicating whether at least a portion of the datastream was altered includes causing the signal to indicate whether a sum of the number of erratic photons of the first portion and the number of erratic photons of the second portion exceeds a predetermined threshold.

3. The method of claim 2, wherein decoding the datastream using the wavelength and polarization of each of the polarized photon further comprises:

associating a first digit value with photons having the first wavelength that belong to the first portion and are polarized along the first polarization axis for the first wavelength according to the polarization measurement;

associating a second digit value with photons having the first wavelength that belong to the first portion and are polarized along the second polarization axis for the first wavelength according to the polarization measurement;

associating the first digit value with photons having the second wavelength that belong to the second portion and are polarized along the third polarization axis for the first wavelength according to the polarization measurement; and associating the second digit value with photons having the second wavelength that belong to the second portion and are polarized along the fourth polarization axis for the first wavelength according to the polarization measurement.

4. The method of claim 3, wherein decoding the datastream using the wavelength and polarization of each of the polarized photon further comprises:

associating the first digit value with photons having the second wavelength that belong to the first portion and are polarized along the first polarization axis for the second wavelength according to the polarization measurement.

5. The method of claim 1, wherein decoding the datastream using the wavelength and polarization of each of the polarized photon comprises:

performing the polarization measurement on a first portion of the incoming photons according to the first measurement basis and on a second portion of the incoming photons according to the second measurement basis for each wavelength;

associating a first digit value with photons having the first wavelength that belong to the first portion and are polarized along the first polarization axis for the first wavelength according to the polarization measurement;

associating a second digit value with photons having the first wavelength that belong to the first portion and are polarized along the second polarization axis for the first wavelength according to the polarization measurement;

associating a third digit value with photons having the second wavelength that belong to the first portion and are polarized along the first polarization axis for the second wavelength according to the polarization measurement; and providing the datastream and a key string that includes the first, second, and third digit values as inputs to a decoding function that outputs a decoded message.

6. The method of claim 5, wherein generating the signal indicating whether at least a portion of the datastream was altered includes:

determining that the decoded message includes one or more digits having the third digit value; and causing the signal to indicate that the datastream was altered.

7. The method of claim 5, wherein decoding the datastream using the wavelength and polarization of each of the polarized photon further comprises:

associating the first digit value with photons having the second wavelength that belong to the first portion and are polarized along the first polarization axis for the second wavelength according to the polarization measurement.

8. An optical communication device, comprising:

a first photon detector configured to detect photons having a first wavelength and to signal polarization orientations of those photons and a first optical polarization controller coupled to the first optical detector;

a second photon detector configured to detect photons having a second wavelength and to signal polarization orientations of those photons and a second optical polarization controller coupled to the second optical detector;

an optical interface coupled to the first and second polarization controllers configured receive incoming photons representing a datastream and to maintain orientation of a polarization of a first incoming photon with respect to polarizations of subsequent incoming photons; and a processor coupled to the first and second optical detectors and to the first and second polarization controllers, the processor configured to:

select a chosen measurement basis between first and second measurement bases for each incoming photon, each measurement basis defining a of pair mutually orthogonal polarization axes for the each of the first and second wavelengths;

configure the first and second polarization controllers such that the first and second optical detectors measure polarization with respect to the measurement basis selected for that photon;

perform a polarization measurement on each photon that determines a polarization axis of that photon in the measurement basis selected for that photon and a wavelength of that photon; and decode the datastream using the wavelengths and polarizations of the incoming photon, including generating a signal indicating whether at least a portion of the datastream was altered;

wherein the first measurement basis defines, for each of the first and second wavelengths, a first polarization axis in a plane for that wavelength and a second polarization axis in that plane that is perpendicular to the first polarization axis for that wavelength;

wherein the second measurement basis defines, for each of the first and second wavelengths, a third polarization axis in the plane for that wavelength and a fourth polarization axis in the plane for that wavelength that is perpendicular to the third polarization axis for that wavelength; and wherein the third and the fourth polarization axes for each wavelength are equally-weighted vector combinations of the first and second polarization axes for that wavelength.

9. The device of claim 8, wherein the processor is further configured to:

perform the polarization measurement on a first portion of the incoming photons according to the first measurement basis and on a second portion of the incoming photons according to the second measurement basis for each wavelength;

determine, according to the polarization measurement, a number erratic of photons of the first portion having the second wavelength having a measured polarization axis that differs from an expected polarization axis of the first measurement basis for the second wavelength;

determine, according to the polarization measurement, a number of erratic photons of the second portion having the first wavelength that have a measured polarization axis that differs from an expected polarization axis of the first measurement basis for the second wavelength; and generate the signal indicating whether at least a portion of the datastream was altered by causing the signal to indicate whether a sum of the number of erratic photons of the first portion and the number of erratic photons of the second portion exceeds a predetermined threshold.

10. The device of claim 9, wherein, when the processor decodes the datastream using the wavelength and polarization of each of the incoming photons, the processor is configured to:

associate a first digit value with photons having the first wavelength that belong to the first portion and are polarized along the first polarization axis for the first wavelength according to the polarization measurement;

associate a second digit value with photons having the first wavelength that belong to the first portion and are polarized along the second polarization axis for the first wavelength according to the polarization measurement;

associate the first digit value with photons having the second wavelength that belong to the second portion and are polarized along the third polarization axis for the first wavelength according to the polarization measurement; and associate the second digit value with photons having the second wavelength that belong to the second portion and are polarized along the fourth polarization axis for the first wavelength according to the polarization measurement.

11. The device of claim 10, wherein, when the processor decodes the datastream using the wavelength and polarization of each of the incoming photons, the processor is further configured to:

associating the first digit value with photons having the second wavelength that belong to the first portion and are polarized along the first polarization axis for the second wavelength according to the polarization measurement.

12. The device of claim 8, wherein, when the processor decodes the datastream using the wavelength and polarization of each of the incoming photons, the processor is configured to:

perform the polarization measurement on a first portion of the incoming photons according to the first measurement basis and on a second portion of the incoming photons according to the second measurement basis for each wavelength;

associate a first digit value with photons having the first wavelength that belong to the first portion and are polarized along the first polarization axis for the first wavelength according to the polarization measurement;

associate a second digit value with photons having the first wavelength that belong to the first portion and are polarized along the second polarization axis for the first wavelength according to the polarization measurement;

associate a third digit value with photons having the second wavelength that belong to the first portion and are polarized along the first polarization axis for the second wavelength according to the polarization measurement; and provide the datastream and a key string that includes the first, second, and third digit values as inputs to a decoding function that outputs a decoded message.

13. The device of claim 12, wherein, when the processor decodes the datastream using the wavelength and polarization of each of the incoming photons, the processor is configured to:

determine that the decoded message includes one or more digits having the third digit value; and cause the signal to indicate that the datastream was altered.

14. The device of claim 12, wherein, when the processor decodes the datastream using the wavelength and polarization of each of the incoming photons, the processor is further configured to:

associate the first digit value with photons having the second wavelength that belong to the first portion and are polarized along the first polarization axis for the second wavelength according to the polarization measurement.

* * * * *

UNITED STATES PATENT AND TRADEMARK OFFICE
CERTIFICATE OF CORRECTION

PATENT NO. : 11,936,782 B2
APPLICATION NO. : 18/104705
DATED : March 19, 2024
INVENTOR(S) : Bertrand F. Cambou et al.

It is certified that error appears in the above-identified patent and that said Letters Patent is hereby corrected as shown below:

In the Specification

Column 10, Line 53, "trits are" should be --trits '–' are--.

Column 10, Line 58, "trits are" should be --trits '–' are--.

Column 12, Line 61, "value is" should be --value '–' is--.

Column 14, Line 56, "01, 00, 10" should be --01, 00, 00, 10--.

Column 16, Line 56, "exclusively and" should be --exclusively '–' and--.

Column 16, Lines 53-54, "value and" should be --value '–' and--.

Column 17, Line 34, "$\{\Psi_0, \Psi_1, \Psi_2, T_3\}$" should be --$\{\Psi_0, \Psi_1, \Psi_2, \Psi_3\}$--.

Signed and Sealed this
Thirteenth Day of January, 2026

John A. Squires
*Director of the United States Patent and Trademark Office*